Patented Jan. 19, 1937

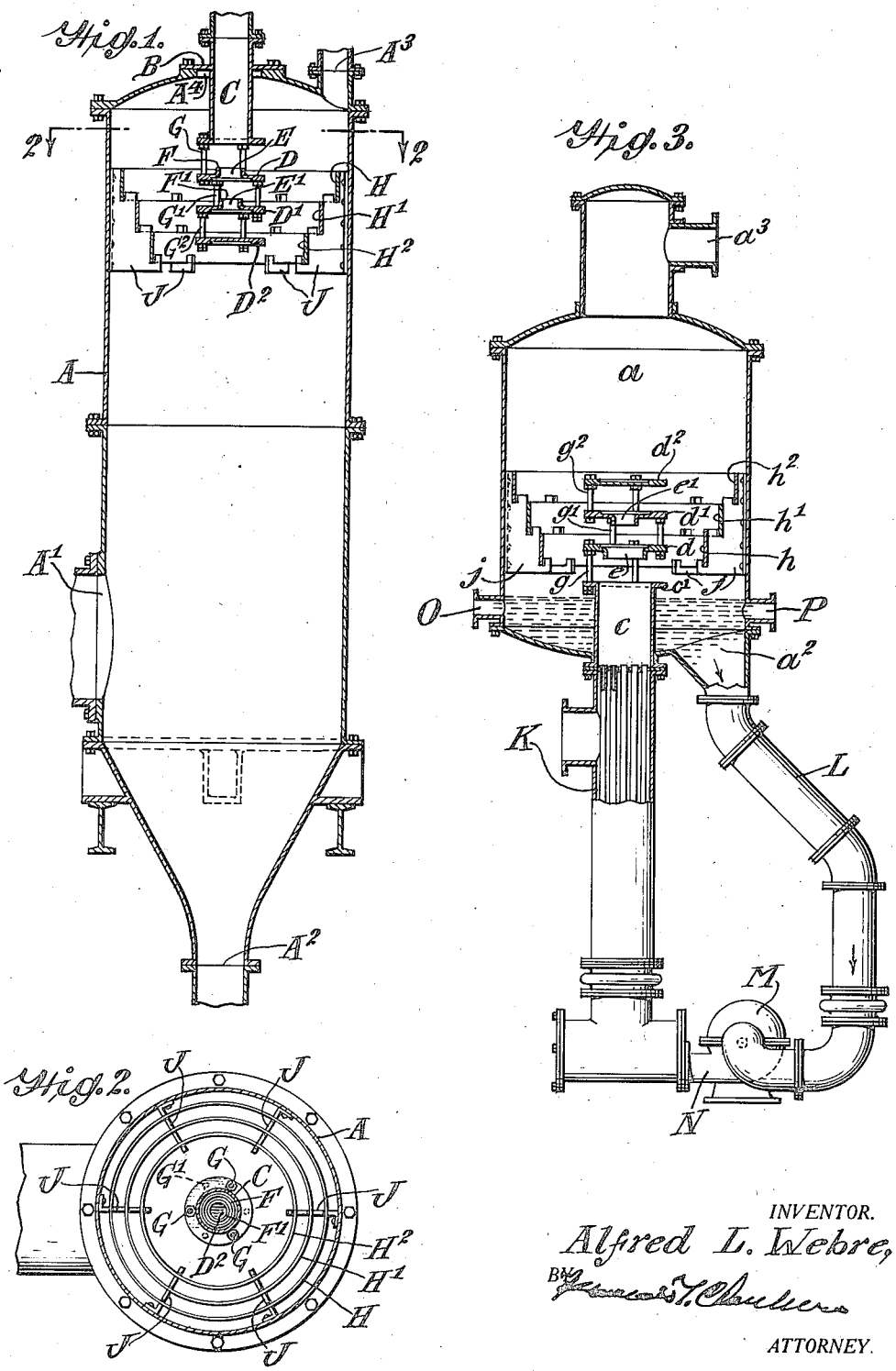

2,068,094

UNITED STATES PATENT OFFICE 2,068,094

LIQUID DIFFUSION APPARATUS

Alfred L. Webre, Merion, Pa., assignor to United States Pipe and Foundry Company, Burlington, N. J., a corporation of New Jersey Application February 26, 1936, Serial No. 65,784

1 Claim. (Cl. 299—121)

My invention relates to apparatus designed to bring about the diffusion of a liquid progressively delivered to the apparatus. A very extensive diffusion of liquids is highly desirable in condensing and evaporating apparatus and also in apparatus in which it is sought to bring about an extensive contact between liquids and gases or vapors either to bring about the absorption of the gas or vapor or a reaction between a gas or vapor and a liquid and my novel diffusion apparatus is, I believe, well adapted for any of the above purposes or for any other purpose in which a prompt and effective diffusion of the liquid may be found advisable.

Essentially, my apparatus may be said to consist of a nozzle adapted to deliver a column of liquid in a vertical direction in combination with a plurality of approximately horizontally located deflecting plates spaced from the nozzle and from each other and arranged in the path of the column of liquid, the plate or plates nearest to the nozzle being formed with orifices lying in the path of the liquid column and of a cross-sectional area less than that of the column of liquid directed toward the plate while the final plate most distant from the nozzle is preferably formed without any substantial orifice. Where a plurality of orificed plates are used the orifices will be of smaller cross-sectional area in successive plates so that in each case a portion of the liquid column will pass through the orifice and a portion contact with the substantially horizontally located plate and be deflected laterally in the form of an annular jet or ring of liquid which will be projected beyond the edges of the preferably circular deflecting plates. The portion of the liquid passing the last orificed plate will contact with the unorificed plate and be directed laterally and radially and an essential feature of my invention consists in providing, in connection with the described deflecting plates, a series of ring like baffles located to intercept the annuli of liquid delivered from the horizontal plates and direct the water downward as an annular curtain, said ring like baffles being of progressively smaller diameter from above downward so that each such baffle will deliver its curtain of liquid outside of the lower ring baffles and this combination of instrumentalities enabling me to secure a remarkably fine distribution of the liquid in horizontal and vertical sheets and curtains. By preference the orificed deflecting plates are provided with projecting rims extending around the edges of the orifices in the direction from which the liquid column is moving and serving to separate the portion of the liquid column which is to pass through the orifice from the portion which is to contact with the surface of the plate before such contact occurs, thereby protecting the portion of the column passing through the orifice from lateral pressure.

It will be obvious that the annular jets of liquid projected laterally over the edges of the deflecting plates will bring about a rapid diffusion of the liquid and increase in its exposed surface owing to the progressive thinning of the water jet and its tendency to break up and become somewhat of a spray and, to insure a free passage of gas or vapor through the annular liquid jets delivered by the deflecting plates, I preferably provide the plates with projections on their faces over which the liquid passes which will serve to separate the annular liquid jet into segments before it leaves contact with the plates.

My invention will perhaps be better understood as described in connection with the drawing forming part of this specification in which Figure 1 is a sectional elevation taken through a condenser provided with my improved diffusion apparatus, the section being taken through the center of the diffusion apparatus.

Figure 2 is a cross section taken on the line 2—2 of Fig. 1, and

Figure 3 is a more or less diagrammatic showing of an evaporating apparatus provided with my improved diffusion mechanism, the diffusion mechanism and the flash chamber in which it is located being shown in central sectional elevation.

In Figs. 1 and 2, A indicates the shell of a condenser and $A^1$ an inlet for steam or other vapor to be condensed, $A^2$ an outlet for the water or other liquid which would usually be connected with a barometric column, $A^3$ an outlet for gases, $A^4$ an opening in the top of the shell or casing A, closed by a closure plate B through which extends a downwardly and vertically directed nozzle C, adapted to deliver downward a vertical column of water or other liquid. D, $D^1$ and $D^2$ are deflecting plates arranged in the path of the water column delivered by the nozzle C and spaced from said nozzle and from each other, the plate D nearest to the nozzle having an orifice E located in the path of the water column but of smaller cross-sectional area so as to give passage to only a portion of the water column while the rest of the water column impacts upon the surface of the deflecting plate and is directed by it radially and laterally so that it leaves the deflecting plate in the form of an annular jet or sheet of liquid of rapidly diminishing thickness and rapidly increasing tendency to break up into more or less of a spray. The plate $D^1$ is also provided with an aligned orifice $E^1$ of smaller diameter than the orifice E in the plate D so as to give passage to only a portion of the liquid column passing through the orifice E, the remainder of this column impacting on the plate and being diffused as described with reference to the plate D. The third plate $D^2$ is shown as without an orifice so that the liquid column passing through the orifice $E^1$ and falling on the center of the plate is diffused radially as described in connection with the other plates. As shown, the orificed plates are provided with projecting rims F and $F^1$ surrounding the orifices and acting to separate the portion of the liquid column which is to pass through the orifice in the plate from the portion which is to contact with the plate before actual contact occurs. As shown, the plates D, $D^1$ and $D^2$ are supported by and removable with the cover plate B, the plate D being supported by the rods G, the plate $D^1$ being supported by the rods $G^1$ which are attached to the plate D and the plate $D^2$ being supported by the rods $G^2$ which are attached to the plate $D^1$; these supporting rods form, as will be obvious, upward projections from the faces of the deflecting plates which serve to divide the sheets of liquid being delivered by the plates laterally in the form of annular disks into segments which is desirable to insure the free passage of gas and vapor through the liquid sheets. H, $H^1$ and $H^2$ indicate ring baffles surrounding the plates D, $D^1$ and $D^2$ and located to intercept the annular jets of liquid from these plates and direct the liquid downward in the form of cylindrical curtains. These ring baffles are of progressively smaller diameter from above downward so that the water curtain delivered from the upper ring baffles will fall outside of the lower ring baffles, thus insuring that the annular jets of liquid can pass freely to the surface of the proper ring baffle without being intercepted by a falling curtain of liquid; as shown, the ring baffles are supported on brackets indicated at J.

In the modified construction shown in Fig. 3, a is the flash chamber of an evaporating apparatus having a liquid outlet $a^2$ and a vapor outlet $a^3$. Centrally located at the bottom of the chamber a is an upwardly extending nozzle indicated at c connected to receive liquid from a heater indicated at K which, in turn, is supplied with liquid through the conduit N by a pump M which is connected to the outlet opening $a^2$ by a conduit L. At O, I have indicated an outlet passage through which concentrated liquid can be withdrawn and at P, I have indicated an inlet passage into the flash chamber through which fresh liquid can be supplied to the apparatus. d, $d^1$ and $d^2$ indicate deflecting plates located above and in line with the nozzle c, the plates d and $d^1$ being provided with aligned orifices e, $e^1$, of a progressively smaller diameter, the orifice e being of smaller diameter than that of the column of water delivered by the nozzle c and the orifice $e^1$ being of smaller diameter than the column of liquid passing the orifice e. The upper plate $d^2$ is shown as without an orifice. The operation of the plates in connection with the nozzle is practically the same as that described in connection with Figs. 1 and 2, except that the undersides of the plates instead of their upper sides act as deflecting surfaces. h, $h^1$ and $h^2$ indicate ring baffles located to intercept the annular jets of liquid delivered by the deflecting plates d, $d^1$ and $d^2$ and direct the liquid downward in the form of cylindrical curtains. These ring baffles are of decreasing diameter from above downward so that the cylindrical curtains from the upper ring baffles will fall outside of the lower ring baffles and not intercept the approximately horizontal jets of liquid delivered from the deflecting plates. The deflecting plates are, as shown, supported in position by rods g, $g^1$ and $g^2$ the rods g being attached to a flange $c^1$ of the nozzle c and the rods $g^1$ being secured to the deflecting plate d while the rods $g^2$ are secured to the deflecting plate $d^1$. The deflecting plates are shown as supported on brackets j secured to the walls of the flash chamber. While I have shown my improved diffusing apparatus in combination with condensing and evaporating apparatus, the subject matter of my present application is the diffusing apparatus itself and the condenser illustrated in Figs. 1 and 2, forms the subject matter of my co-pending application Serial Number 65,782, filed February 26, 1936 and the evaporating apparatus indicated in Fig. 3 forms the subject of my co-pending application, Serial Number 65,781, filed February 26, 1936.

In referring to the deflecting plates as substantially horizontally located, I do not wish to be understood as limiting myself to the use of flat plates for obviously the deflecting surfaces of the plates may be more or less angled or curved with reference to a horizontal plane but in all cases the deflecting plates should be set transversely to the direction of the vertical column of liquid so as to effect a symmetrical distribution of the liquid contacting with the plates in radial directions so as to bring about the formation of more or less horizontal annuli or rings of the liquid.

Having now described my invention, what I claim as new and desire to secure by Letters Patent, is:

Liquid diffusion apparatus comprising a nozzle adapted to project a vertical column of liquid, a plurality of approximately horizontally located deflecting plates arranged in the path of the liquid column delivered by the nozzle and spaced from the nozzle and from each other, said plates being formed with aligned orifices lying in the path of the liquid column, the orifice in the plate adjacent to the nozzle being of smaller cross-section than that of the liquid column and the orifices in the succeeding plates being of progressively smaller cross-section so that in each case a portion of the liquid column will contact with the plate and be laterally directed thereby while a portion of the liquid column will pass through the orifice in the plate and be similarly acted upon by the succeeding plate, and a plurality of ring baffles located to intercept the radial jets of water delivered by individual deflecting plates and directing the water downward in an approximately annular curtain, said ring baffles being of progressively smaller diameter from above downward.

ALFRED L. WEBRE.